Dec. 21, 1954
W. H. DIEHL ET AL
APPARATUS FOR MAKING SEALED TUBES
FOR FIVE PIECE DRY REED SWITCHES
2,697,307
Filed May 20, 1952
3 Sheets-Sheet 2
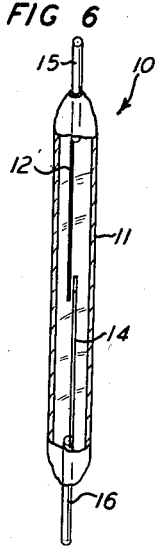
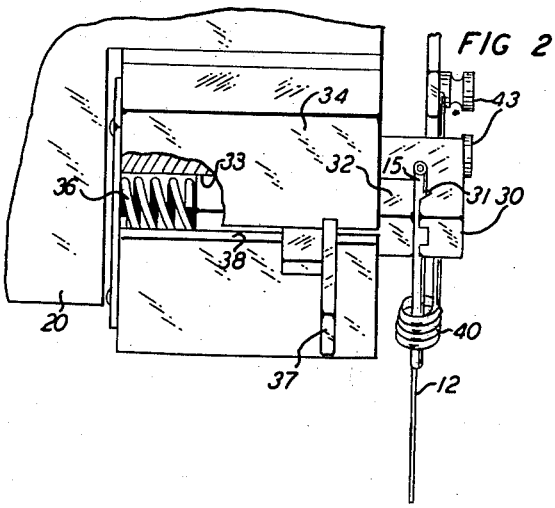
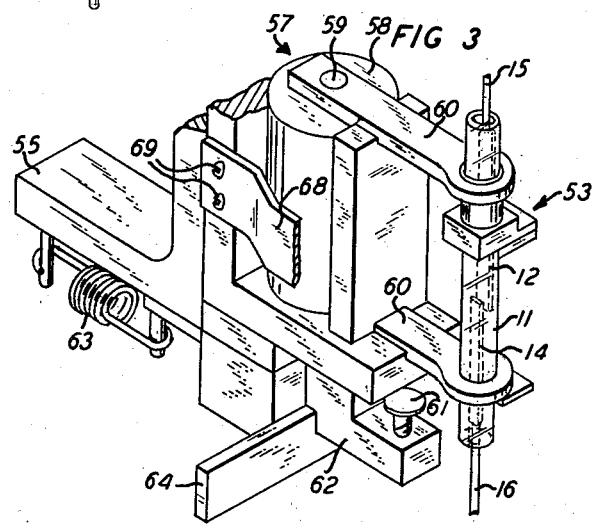
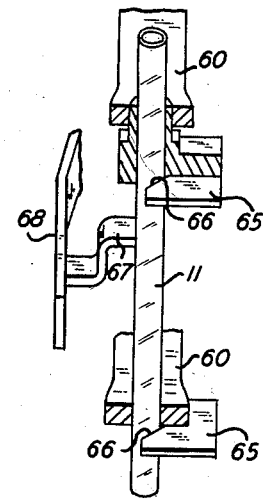
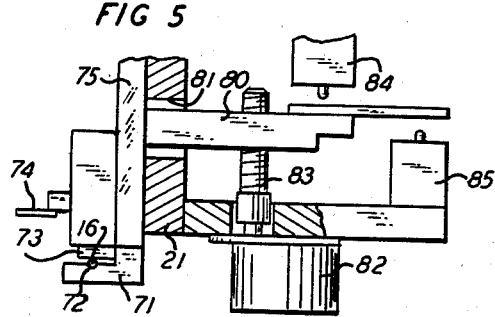
INVENTORS
W. H. DIEHL
A. L. HOUSE
BY
*W.C. Parnell*
ATTORNEY Dec. 21, 1954

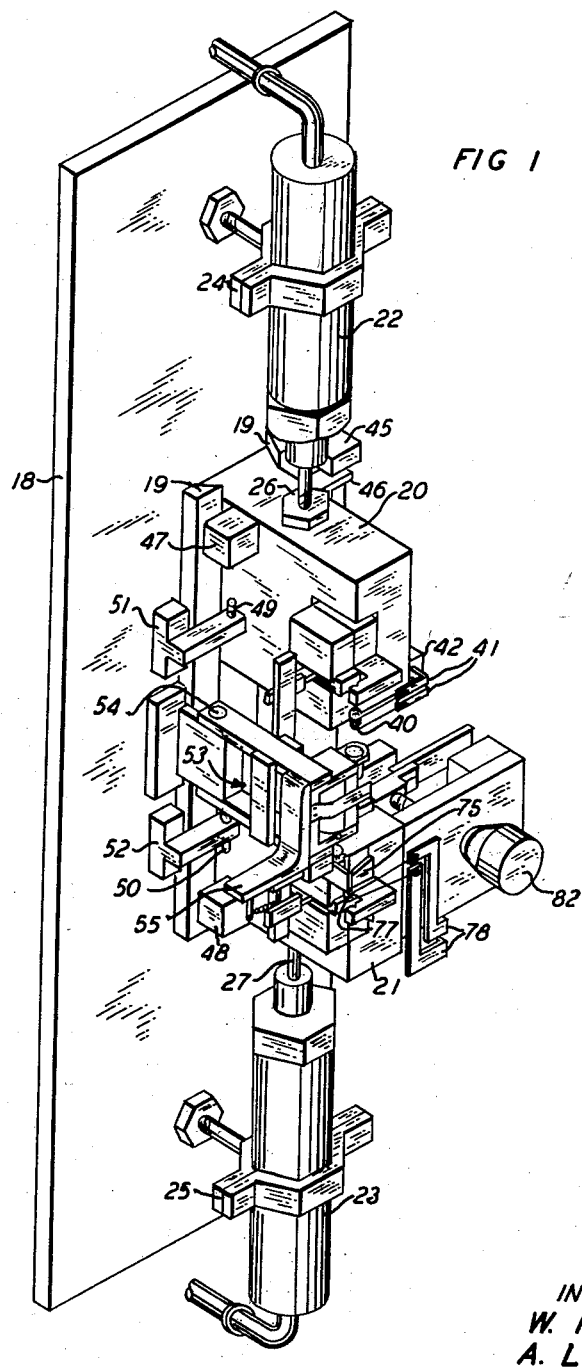

W. H. DIEHL ET AL
APPARATUS FOR MAKING SEALED TUBES
FOR FIVE PIECE DRY REED SWITCHES 2,697,307

Filed May 20, 1952

INVENTORS
W. H. DIEHL
A. L. HOUSE

BY
ATTORNEY

United States Patent Office 2,697,307
Patented Dec. 21, 1954

2,697,307

APPARATUS FOR MAKING SEALED TUBES FOR FIVE PIECE DRY REED SWITCHES

Walter H. Diehl, Allentown, and Allston L. House, Emmaus, Pa., assignors to Western Electric Company, Incorporated, New York, N. Y., a corporation of New York Application May 20, 1952, Serial No. 288,844

8 Claims. (Cl. 49—1)

This invention relates to apparatus for making sealed tubes with magnetically movable elements therein and more particularly to dry reed switches.

In the past, dry reed switches have been made by successive steps including first, locating and sealing of one reed in its respective end of the tube and then locating the second reed as accurately as possible relative to the first reed and sealing it in its respective end of the tube. With this arrangement of successive steps, it is difficult to assure accurate positioning of the reeds. This is a very important feature in that it determines the efficiency of the switch.

An object of the present invention is an apparatus for simultaneously and efficiently assembling magnetically movable elements in a tube.

With this and other objects in view, the invention comprises an apparatus for making sealed tubes with magnetically movable elements therein, includig carriages for clamps, holding the elements movable in given paths relative to a chuck for a tube, to move the elements into their respective ends of the tube after which means is operable to move one of the clamps on its carriage to move the element carried thereby laterally toward the other element.

In the present embodiment of the invention, the reeds, or magnetically movable elements held by their respective clamps, are assured by adjustable stops of being disposed in pre-determined overlapping positions. While in this position, one of the reeds is adjusted in its clamp relative to the other reed to assure their parallel positions relative to each other. The apparatus is then set in operation, energizing a motor to slowly move one reed toward the other until they are actuable into closed positions by an electro-magnet, resulting in the completion of a circuit through the elements to de-energize the motor and energize heating elements, individually controlled by timing units to bring about sealing of the ends of the tube.

Other objects and advantages will be apparent from the following detailed description when considered in conjunction with the accompanying drawings, wherein:

Fig. 1 is an isometric view of the apparatus;

Fig. 2 is a view of the upper clamp for one of the parts to be assembled, looking downwardly thereon from one side thereof;

Fig. 3 is a fragmentary isometric view of the tube holding chuck and electro-magnet;

Fig. 4 is a fragmentary vertical sectional view of a portion of the chuck shown in Fig. 3.

Fig. 5 is a fragmentary sectional view of the lower chuck and carriage;

Fig. 6 is an isometric view of one of the completed articles; and,

Figure 7:
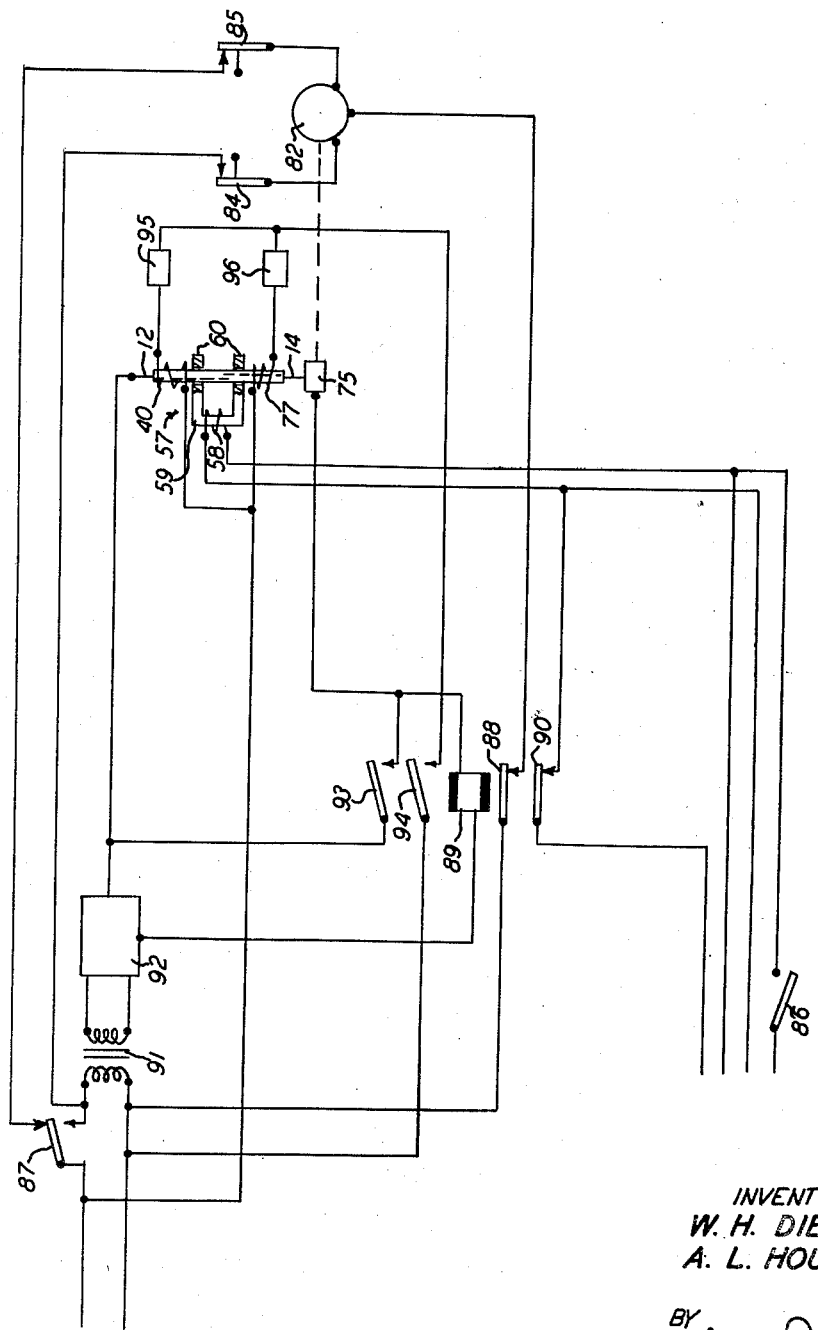
Fig. 7 is a schematic view of a portion of the wiring diagram.

Referring now to the drawings, attention is first directed to Fig. 6 illustrating the article indicated generally at 10, including a fusible tube 11, an upper part 12, and a lower part 14. The parts 12 and 14 are substantially identical in structure they being composed of flat strips of magnetizable material having their outermost ends welded to tubes 15 and 16.

The apparatus includes a vertically positioned main support 18, having spaced dove-tailed guides 19 mounted at spaced positions thereon to form a guided path for an upper carriage 20 and a lower carriage 21. Air cylinders 22 and 23 are mounted by the aid of brackets 24 and 25 on the support 18 above and below their respective carriages 20 and 21 where their piston rods 26 and 27 are secured to their carriages.

The carriage 20 shown more in detail in Fig. 2 includes a fixed jaw 30 having a V-shaped groove 31 therein to receive the tubular member 15 of the upper part 12. A movable jaw 32, slidable in an aperture 33 of a hollow member 34 of the carriage, is normally urged outwardly by a spring 36 and has a handle 37 extending through a slot 38 whereby the jaw 32 may be moved to the left, opening the upper clamp to receive or free a part. A heating coil 40 is supported by the carriage 20 and insulated therefrom, the convolutions of the coil being concentric with the tubular portion 15 of the part 12 and mounted in the clamp. In actual structure, the coil 40 has its ends secured to conductive bars 41 carried by a block of insulating material 42 mounted on the side of the carriage 20 and provided with terminals 43 for connection in an electrical circuit. The air cylinders 22 and 23 may be under the control of an electrically operable normally closed valve, not shown, the winding of which is in a circuit including a normally closed microswitch 45 mounted on the support 18 and operated into open position by a projection 46 on the carriage 20, when the carriages 20 and 21 reach their desired loading positions to de-energize the valve winding and stop movement of the carriages. Projections 47 and 48 on the carriages 20 and 21 are positioned to engage adjustable stops 49 and 50 carried by brackets 51 and 52 mounted on the support 18. Through the aid of these stops, the innermost positions of the carriages are determined to assure accurate overlapping of the inner ends of the parts or reeds 12 and 14.

A chuck indicated generally at 53 for the fusible tube 11 is pivotally supported at 54 and normally urged into the assembling position by the aid of a spring not shown, but movable out of this position by the aid of a handle 55 to remove the completed article. The chuck 53 supports an electro-magnet indicated generally at 57 and including a coil 58 with a core 59 having apertured arms 60. The apertures in the arms 60 are in alignment with each other to receive the glass tube 11 and the parts 12 and 14 when positioned in the tube. An adjustable locating member 61 carried by a slide 62, normally held in the position shown by a spring 63, is movable by the aid of a handle 64 to support the tube 11 to accurately locate it in the chuck. The chuck includes members 65 carried by their respective arms 60 and provided with V-shaped notches 66 for engagement with the tube 11. An element 67 supported by a resilient member 68 mounted at 69 is adapted to hold the tube 11 in the grooves of the members 65 of the chuck.

The lower carriage 21 includes a clamp having a jaw 71 with a V-shaped groove 72 therein to receive the tubular member 16 of the lower part 14 and cooperate with a spring pressed jaw 73 similar in structure to the jaw 32 in Fig. 2 and actuable by the aid of a handle 74 to open the jaws to receive or free the lower part. The jaw 71 has a dove-tailed portion 75 slidably disposed in dove-tailed guides of the carriage 21 so that the lower part 14 may move vertically with the carriage 21 and laterally with the clamp 71—73. The carriage 21 has a heating element 77 which is similar in structure to the heating element 40 shown in Fig. 2, having its conductive ends secured to conductive elements 78 included in an electrical circuit. The portion 75 of the clamp has a member 80 integral therewith and extending through an aperture 81 of the carriage 21. A motor 82 electrically energizable and adapted to drive a threaded element 83 at a slow rate of speed, is of the reversible type and is mounted on the carriage 21. The threaded element 83 extends through a threaded aperture of the member 80 whereby rotation of the element in either direction will cause movement of the member 80 to impart movement to the clamp. Micro-switches 84 and 85 are supported by the carriage 21 and spaced given distances relative to the member 80 to respectively limit movement of the clamp in forward and reverse directions.

Attention is now directed to Fig. 7 illustrating the main portion of the wiring diagram for the apparatus. In one instance during the positioning of the parts 12 and 14 relative to each other, a switch 86 is closed to temporarily energize the coil 58 to cause the part 14 to be moved into parallel engagement with the part 12 prior to clamping of the part 14 firmly in the jaws 71—73. A switch 87 normally disposed in the reverse position shown, completes a circuit through the reverse winding of the motor 82 and a normally closed contact 88 of a relay 89. The other normally closed contact 90 of the relay 89 completes a circuit through the winding 58 of the electro-magnet 57. It will be noted that the parts 12 and 14 being assembled, are in a circuit with the winding of the relay 89 so that whereby this circuit will be closed to energize the relay when the part 14 has moved to within a given distance of the part 12 to be magnetically attracted to each other. This circuit includes a transformer 91 and a rectifier 92. Energization of the winding 89 will open contacts 88 and 90 and close contacts 93 and 94. Opening of contact 88 will de-energize the motor 82 causing it to stop the lateral movement of the clamp supporting the part 14. Opening of contact 90 will de-energize the electro-magnet 57. Closing of contact 93 will complete a locking circuit from one side of the rectifier 92, through the relay 89 and contact 93 to the other side of the rectifier to lock or hold the relay operated. Closing of contact 94 will complete circuits through the heating coils 40 and 77, including individual timing units 95 and 96.

Considering now the operation of the apparatus, let it be assumed that the apparatus is in its loading position. At this time, a glass tube 11 may be located in the chuck 53 through the aid of the element 61. The upper part or reed 12 may be inserted through the heating coil 40 and into a given position in the clamp while the jaw 32 is in its open position. The operator will purposely attempt to locate the reed 12 parallel with the face of the carriage 20. The operator then locates the part 14 in the clamp of the lower carriage 21. However, this clamp is not completely closed on the part until the switch 86 has been temporarily closed and the part 14 located in a position parallel with the part 12. This having been accomplished and the carriage 21 now in its starting position, suitable means (not shown) may be actuated to cause air under pressure to enter the top and bottom of the air cylinders 22 and 23 respectively to move the carriages 20 and 21 into engagement with their respective stops 49 and 50. The switch 87 may be moved from the reverse position to the forward position energizing the motor 82 causing it to drive the element 83 to move the lower clamp with the part 14 slowly toward the part 12. During this interval of time, the electro-magnet 57 is energized so that the moment the overlapping ends of the parts 12 and 14 reach a position where they are magnetically attracted to each other by the electro-magnet, a circuit will be completed through the parts to energize the winding 89, operating the contacts of the relay to de-energize the motor 82 as well as the electro-magnet 57, lock in the relay through the contact 93 and energize the heating elements 40 and 77. By positioning the apertured arms 60 as extensions of the core 59 so that they extend around their respective parts 12 and 14, these parts are polarized through energization of the electro-magnet to attract each other so that the moment the parts are positioned sufficiently close to bring about this attraction of the overlapping ends into engagement with each other, the parts are correctly positioned relative to each other. The locating means for the magnetically movable elements 12 and 14 are directly under the control of the elements so that the moment the predetermined relative positions of the parts have been reached, the motor 82 of the moving means therefor is de-energized. At the same time, the electro-magnet which causes the attraction of the parts is de-energized so that the parts are free of tension when fused in the ends of the tube.

The timing units 95 and 96 are set to de-energize their respective heating coils 40 and 47 after sufficient time has elapsed to bring about satisfactory fusing of the ends of the tube. The upper end of the tube when fused, will naturally fall in and about the part 12 requiring less time than will be needed for fusing the lower end of the tube. When the assembly has been completed, the operator may return the switch 87 to the reverse position, reversing the motor 82 to return the lower clamp to its starting position determined by the limit switch 85. The microswitch 84 which also serves as a limit switch in a forward circuit may not be actuated except should something permit continued driving of the motor forwardly. If desired, the reversing of the motor may be delayed until the next bottom part or reed is located parallel with the top part or reed.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for making sealed tubes with magnetically movable elements therein comprising a chuck to support a tube in a given position, clamps for the elements, carriages for the clamps mounted for movement on opposing sides of the chuck to move the clamps in given paths to move the elements into their respective ends of the tube, and means supported by one of the carriages and operable to move its clamp to move the element carried thereby laterally toward the other element.

2. An apparatus for making sealed tubes with magnetically movable elements therein comprising a chuck to support a tube, a retractable member to locate the tube at a given position in the chuck, clamps for the elements, carriages for the clamps mounted for movement on opposing sides of the chuck to move the clamps in given paths to move the elements into their respective ends of the tube, and means supported by one of the carriages and operable to move its clamp to move the element carried thereby laterally toward the other element.

3. An apparatus for making sealed tubes with magnetically movable elements therein comprising a chuck for tubes of various sizes, a support movable relative to the chuck, a member carried by the support and having a locating surface disposed at varied positions relative to the support and the chuck to locate tubes of various sizes singly at given positions in the chuck, clamps for the elements, carriages for the clamps mounted for movement on opposing sides of the chuck to move the clamps in given paths to move the elements into their respective ends of the tube, and means supported by one of the carriages and operable to move its clamp to move the element carried thereby laterally toward the other element.

4. An apparatus for making sealed tubes with magnetically movable elements therein comprising a chuck to support a tube, clamps for the elements, carriages for the clamps mounted for movement relative to opposing sides of the chuck to move the clamps toward each other and the chuck to move the elements through their respective ends of the tube until their inner ends overlap at spaced positions, an electromagnetic unit disposed adjacent the chuck and adapted to cause attraction of the overlapping inner ends of the elements into engagement with each other when the overlapping ends are disposed within a given distance of each other, means to cause relative movement of the clamps with the elements until the overlapping ends of the elements are within the given distance of each holder, and heating elements supported by and movable with the carriages to seal the ends of the tubes simultaneously about their elements.

5. An apparatus for making sealed tubes with magnetically movable elements therein comprising a chuck to support a tube, clamps for the elements, carriages for the clamps mounted for movement relative to opposing sides of the chuck to move the clamps toward each other and the chuck to move the elements through their respective ends of the tube until their inner ends overlap at spaced positions, an electromagnetic unit disposed adjacent the chuck and adapted to cause attraction of the overlapping inner ends of the elements into engagement with each other when the overlapping ends are disposed within a given distance of each other, and an electrically energizable unit mounted on one of the carriages to move its clamp and element laterally until the overlapping ends of the elements are disposed in the given distance relative to each other.

6. An apparatus for making sealed tubes with magnetically movable elements therein comprising a chuck to support a tube, clamps for the elements, carriages for the clamps mounted for movement relative to opposing sides of the chuck to move the clamps toward each other and the chuck to move the elements through their respective ends of the tube until their inner ends overlap at spaced positions, an electromagnetic unit disposed adjacent the chuck and adapted to cause attraction of the overlapping inner ends of the elements into engagement with each other when the overlapping ends are disposed within a given distance of each other, an electrically energizable unit mounted on one of the carriages to support its clamp for lateral movement and when energized adapted to move the clamp and element laterally until the overlapping ends of the elements are disposed in the given distance relative to each other, and a control circuit for the unit including the elements whereby the unit is deenergized by engagement of the overlapping ends of the elements.

7. An apparatus for making sealed tubes with magnetically movable elements therein comprising a chuck to support a tube, a magnetic unit disposed adjacent the chuck to cause engagement of overlapped portions of the elements by polarization thereof when disposed within a given distance of each other in the tube, clamps for the elements, carriages for the clamps mounted for movement relative to the opposing sides of the chuck to move the clamps toward each other and the chuck, means to move the carriages toward each other to move the elements into opposite ends of the tube with their inner ends overlapping beyond the said given distance from each other, means to cause relative movement of the clamps with the elements until the overlapping ends of the elements are within the given distance of each other, and heating elements supported by and movable with the carriages to seal the ends of the tubes simultaneously about their elements.

8. An apparatus for making sealed tubes with magnetically movable elements therein comprising a chuck to support a tube, a magnetic unit disposed adjacent the chuck to cause engagement of overlapped portions of the elements by polarization thereof when disposed within a given distance of each other in the tube, clamps for the elements, carriages for the clamps mounted for movement relative to opposing sides of the chuck to move the clamps toward each other and the chuck, means to move the carriages toward each other to move the elements into opposite ends of the tube with their inner ends overlapping beyond the said given distance from each other, an electrically energizable unit mounted on one of the carriages to support its clamp for lateral movement and when energized adapted to move the clamp and element laterally until the overlapping ends of the elements are disposed in the given distance relative to each other, and a control circuit for the unit including the elements whereby the unit is deenergized by engagement of the overlapping ends of the elements.

References Cited in the file of this patent

UNITED STATES PATENTS

| Number | Name | Date |
| --- | --- | --- |
| 842,007 | Parker | Jan. 22, 1907 |
| 1,653,381 | Whitmore et al. | Dec. 20, 1927 |
| 2,391,573 | Herzog | Dec. 25, 1945 |
| 2,511,914 | Haas | June 20, 1950 |
| 2,523,903 | Ellwood | Sept. 26, 1950 |
| 2,575,746 | Cartun | Nov. 20, 1951 |

FOREIGN PATENTS

| Number | Country | Date |
| --- | --- | --- |
| 542,173 | Germany | Jan. 22, 1932 |